United States Patent
Ito et al.

(10) Patent No.: US 6,682,796 B2
(45) Date of Patent: Jan. 27, 2004

(54) FUEL HOSE

(75) Inventors: Hiroaki Ito, Kasugai (JP); Shinji Iio, Inazawa (JP)

(73) Assignee: Tokai Rubber Industries, Ltd., Komaki (JP)

( * ) Notice: Subject to any disclaimer, the term of this patent is extended or adjusted under 35 U.S.C. 154(b) by 25 days.

(21) Appl. No.: 09/864,204

(22) Filed: May 25, 2001

(65) Prior Publication Data

US 2002/0006491 A1 Jan. 17, 2002

(30) Foreign Application Priority Data

May 31, 2000 (JP) ........................................ 2000-166452

(51) Int. Cl.[7] ................................................ B32B 1/08
(52) U.S. Cl. .................. 428/36.91; 428/34.1; 428/35.7; 428/36.6; 428/36.8; 428/36.9; 428/36.91; 138/137; 138/140; 138/141
(58) Field of Search ............................... 428/36.8, 36.9, 428/36.91, 36.92, 34.1, 35.7, 36.6; 138/137, 140, 141

(56) References Cited

U.S. PATENT DOCUMENTS

| | | | |
|---|---|---|---|
| 4,257,699 A | * 3/1981 | Lentz ..................... | 355/3 FU |
| 4,489,196 A | * 12/1984 | Schmiegel ............... | 525/326.3 |
| 4,530,972 A | 7/1985 | Tatemoto et al. ........... | 525/276 |
| 5,427,831 A | * 6/1995 | Stevens .................... | 428/36.2 |
| 5,472,746 A | * 12/1995 | Miyajima et al. ........... | 427/468 |
| 5,588,469 A | * 12/1996 | Kakiuchi et al. ........... | 138/137 |
| 5,958,532 A | * 9/1999 | Krause et al. ............. | 428/36.3 |
| 6,106,914 A | * 8/2000 | Kanbe et al. .............. | 428/36.91 |
| 6,240,970 B1 | * 6/2001 | Ostrander et al. .......... | 138/137 |

FOREIGN PATENT DOCUMENTS

| | | |
|---|---|---|
| JP | 06-255004 | 9/1994 |
| JP | 07-112510 | 5/1995 |
| JP | 08-118549 | 5/1996 |
| JP | 08-169085 | 7/1996 |
| JP | 08-294998 | 11/1996 |
| JP | 11-082822 | 3/1999 |

OTHER PUBLICATIONS

Database WPI, Section Ch, Week 198406, Derwent Publications Ltd, XP002177536, JP 58 220732 A, (Nippon Zeon KK), Dec. 1983.
Database WPI, Section Ch, Week 199101, Derwent Publications Ltd, XP002177537, JP 02 281062 A (Japan Synthetic Rubber Co. Ltd.) Nov. 1990.

* cited by examiner

*Primary Examiner*—Harold Pyon
*Assistant Examiner*—Walter B Aughenbaugh
(74) *Attorney, Agent, or Firm*—Jacobson Holman PLLC

(57) ABSTRACT

A fuel hose having a fluororesin layer formed from a copolymer of vinylidene fluoride and chlorotrifluoroethylene by powder coating or the like on the inner surface of a rubber tube is characterized by at least one of the following: (1) the copolymer contains a metal salt; (2) the rubber tube is of a mixture containing acrylic rubber; and (3) the rubber tube contains an organic ammonium salt or the like. The fuel hose is high in gasoline impermeability and flexibility and has a strong adhesion between the rubber tube and fluororesin layer.

17 Claims, 2 Drawing Sheets

FUEL HOSE

BACKGROUND OF THE INVENTION

1. Field of the Invention

This invention relates to a fuel hose used for a fuel piping in a motor vehicle or the like. The fuel hose of this invention has a high resistance to gasoline, particularly alcohol-containing gasoline, sour gasoline and amine detergent. It is also suitably used for alcohol and hydrogen which are fuels for fuel cells.

2. Description of the Related Art

The necessity for reducing the amount of gasoline discharged into the atmosphere has recently been pointed out in connection with the environmental problems. Accordingly, the permeation of gasoline through the walls of fuel hoses in motor vehicles has come to be regulated still more strictly. Conventional fuel hoses having a single-layered wall of NBR/PVC (a mixture of acrylonitrile-butadiene rubber and polyvinyl chloride) or the like are not satisfactory for such regulations against the permeation of gasoline.

Alcohol-containing gasoline, which is used for cleaning the exhaust gas of a motor vehicle, is more likely to permeate through the wall of a fuel hose than gasoline not containing alcohol. This is another reason for a demand for a fuel hose having a wall which is less permeable to gasoline.

Therefore, it has been proposed that a fuel hose have a multilayered structure, and particularly that one layer in the multilayered structure be a fluororesin layer of very low permeability to gasoline. These proposals can be roughly classified into two groups depending on the processes employed. According to one group, an uncured rubber tube is laminated with an extruded fluororesin layer, and joined to it by curing. According to the other group, a fluororesin layer is formed on a cured rubber tube by a powder coating method.

One example of the former is disclosed in Japanese Patent Application Laid-Open No. 118549/1996. It discloses an invention in which an uncured tube of epichlorohydrin rubber containing an organic phosphonium salt is laminated with an extruded fluororesin layer and cured. Another example is disclosed in Japanese Patent Application Laid-Open No. 169085/1996. It discloses an invention in which an uncured outer rubber tube and an uncured inner rubber tube are laminated with a fluororesin layer extruded therebetween, and cured. The outer rubber tube is formed from uncured epichlorohydrin rubber containing a salt of 1, 8-diazabicyclo[5, 4, 0]undecene-7 (DBU salt) and an organic phosphonium salt. The inner rubber tube is formed from uncured NBR or fluororubber each containing a DBU salt or an organic phosphonium salt.

One example of the latter is disclosed in Japanese Patent Application Laid-Open No. 255004/1994. It discloses an invention of a fuel hose having a fluororesin layer formed on the inner surface of a cured rubber tube by electrostatically coating it with a fluororesin powder, followed by heating and cooling. According to this invention, pre-treatment, such as sodium etching, corona or low temperature plasma treatment, is applied to the inner surface of the rubber tube to ensure the adhesion between it and the fluororesin layer.

According to the former group of prior art as stated above, the rubber tube and the fluororesin layer adhere well to each other by adhesion in cure. The fluororesin layer formed by extrusion is, however, difficult to form with a small thickness of, say, 0.05 to 0.2 mm or less with good quality. Thus, it has been a problem that, as the fluororesin layer does not have a satisfactorily small thickness, the fuel hose loses flexibility, and eventually cracks, or has its wall layers separated from each other as a result of, for example, vehicle vibration. The fluororesin layer formed by extrusion has a substantially equal thickness along the whole length of the rubber tube. It has, therefore, been a problem that the fluororesin layer formed on the inner surface of the rubber tube makes the hose fail to form a tight seal at the hose connecting end. It has been another problem that a large force is required for the insertion of a pipe into a hose connecting end. It has been still another problem that the extruded fluororesin layer is difficult to form in a corrugated shape.

According to the latter group of prior art as stated above, however, it is easy to form the fluororesin layer with a thickness which is as small as, say, 0.05 to 0.2 mm, or even smaller. It is also possible to select that portion of the rubber tube which is to be coated with the fluororesin powder, and the thickness of its coating to be formed. It is, therefore, possible to form the fluororesin layer not reaching the hose connecting end and thereby avoid the problem of its sealing as pointed out above, when it is formed on the inner surface of the rubber tube. Even in the case where the fluororesin layer is so formed as to reach the hose connecting end, it is possible to form it with a smaller thickness adjacent to the hose connecting end and thereby reduce the force required for the insertion of a pipe thereinto. It is also easy to form the fluororesin layer in a corrugated shape.

In view of the foregoing, a fuel hose having a multilayered structure including a fluororesin layer is preferably manufactured by the latter process.

The latter process has, however, problems not pointed out in the above Japanese Patent Application Laid-Open No. 255004/1994, etc. A fluororesin usually employed for powder coating has a considerably high melting temperature. Therefore, the rubber tube is deteriorated by heat when the fluororesin applied by powder coating is melted and caused to adhere to the rubber tube. This problem may be avoided by using a fluororesin having a low melting temperature, such as a vinylidene fluoride homopolymer. A fluororesin having a low melting temperature is, however, so high in rigidity as to deprive the fuel hose of its flexibility, while not adhering to the rubber layer satisfactorily, either. Another problem is that the pre-treatment mentioned above, such as sodium etching, complicates the manufacturing process.

Under these circumstances, the inventors of this invention made an invention disclosed in Japanese Patent Application No. 196839/1998 (Laid-Open No. 82822/1999). It is a fuel hose having a wall comprising a rubber layer or layers and a fluororesin layer formed from a copolymer of vinylidene fluoride (VDF) and chlorotrifluoroethylene (CTFE) and forming the innermost layer of the wall.

The fluororesin layer forming the innermost layer of the wall gives it high resistance and impermeability to alcohol-containing gasoline, sour gasoline, amine detergent, etc. As the fluororesin has a relatively low melting point, it is possible to avoid any deterioration of the rubber tube by heat when the molten fluororesin is caused to adhere to it. According to this prior application, at least the innermost layer of the rubber tube contains at least one of an organic ammonium salt, an organic phosphonium salt and a polyamine additive, so that a good adhesion can be obtained between the rubber tube and the fluororesin layer without relying upon vulcanization adhesion even if the fluororesin layer may be formed by powder coating.

It has, however, been found by further research that the use of a copolymer of VDF and CTFE as the fluororesin may somewhat reduce the gasoline impermeability of the hose. It has also been found that the addition of an organic ammonium or phosphonium salt, or a polyamine additive is effective for obtaining an improved initial adhesion between the rubber and fluororesin layers, but it is not always effective for maintaining an improved adhesion after the hose is filled with fuel.

SUMMARY OF THE INVENTION

It is an object of this invention to provide a simple and effective method of obtaining both an improved initial adhesion between the rubber and fluororesin layers of a hose and an improved adhesion after the hose is filled with fuel, without allowing the deterioration of the rubber layer by heat or any lowering in gasoline impermeability of the hose.

According to a first aspect of this invention, there is provided a fuel hose comprising a single-layered or multi-layered rubber tube and a fluororesin layer formed wholly or partially on the inner surface of the single-layered rubber tube or the inner surface of the innermost layer of the multilayered rubber tube, wherein the fluororesin layer is of a copolymer of vinylidene fluoride (VDF) and chlorotrifluoroethylene (CTFE) containing a metal salt in an amount not exceeding 0.3% by weight relative to the copolymer.

The fluororesin layer makes the hose highly resistant and impermeable to alcohol-containing gasoline, sour gasoline, amine detergent, etc. As the fluororesin has a relatively low melting point, it is possible to avoid any deterioration of the rubber tube by heat when the molten fluororesin is caused to adhere to it. As the fluororesin is relatively low in hardness, the hose retains its flexibility. Moreover, the metal salt serves to ensure the low permeability of the hose to gasoline owing probably to its promotion of minute crystallization of the fluororesin copolymer.

According to a second aspect of this invention, the fuel hose satisfies at least one of the following:

(1) the metal salt is a salt of a monovalent or divalent metal;
(2) the metal salt is an inorganic salt of a monovalent or divalent metal such as a halide, a hydroxide, a carbonate and a sulfate thereof;
(3) the metal salt is potassium chloride; and
(4) the content of the metal salt is in the range of 0.05 to 0.3% by weight.

The metal salt is preferably (1), more preferably (2) and still more preferably (3). It is preferably a neutral salt. The content of the salt is preferably selected from the range (4).

According to a third aspect of this invention, the fluororesin layer of the first or second aspect of the invention has a thickness of 0.05 to 0.2 mm. Its thickness as defined ensures the satisfactory flexibility of the hose, while retaining its low fuel permeability.

According to a fourth aspect of this invention, there is provided a fuel hose comprising a single-layered or multi-layered rubber tube and a fluororesin layer formed wholly or partially on the inner surface of the single-layered rubber tube or the inner surface of the innermost layer of the multilayered rubber tube, wherein the fluororesin layer is a copolymer of VDF and CTFE and the rubber tube is of a rubber mixture containing acrylic rubber in an amount of 5 to 35 phr (parts per hundred parts of rubber) relative to a base material of the rubber tube. The hose has both an improved initial adhesion between the rubber tube and fluororesin layer and an improved adhesion after fuel filling owing to the acrylic rubber, in addition to the advantages of the fluororesin layer as stated above in connection with the hose according to the first aspect of this invention.

According to a fifth aspect of this invention, the fuel hose of the fourth the aspect satisfies the following (5) and/or (6):

(5) the content of acrylic rubber is from 5 to 25 phr relative to the base material of the rubber tube; and
(6) the acrylic rubber is composed of an alkyl or alkoxy acrylate.

The preferred content of acrylic rubber is defined at (5), and the preferred type thereof at (6).

According to a sixth aspect of this invention, the fluororesin layer in the hose according to the fourth or fifth aspect of this invention has a thickness of 0.05 to 0.2 mm. Its thickness as stated ensures the satisfactory flexibility of the hose while retaining its low fuel permeability.

According to a seventh aspect of this invention, there is provided a fuel hose comprising a single-layered or multi-layered rubber tube and a fluororesin layer formed wholly or partially on the inner surface of the single-layered rubber tube or the inner surface of the innermost layer of the multilayered rubber tube, wherein the fluororesin layer is of a copolymer of VDF and CTFE containing not more than 0.3% by weight of a metal salt relative to the copolymer and the rubber tube is of a rubber mixture containing 5 to 35 phr of acrylic rubber relative to a base material of the rubber tube. The hose combines the advantages of the fluororesin layer and the metal salt added to it according to the first aspect of this invention and the acrylic rubber according to the fourth aspect thereof.

According to an eighth aspect of this invention, there is provided a fuel hose comprising a single-layered or multi-layered rubber tube and a fluororesin layer formed wholly or partially on the inner surface of the single-layered rubber tube or the inner surface of the innermost layer of the multilayered rubber tube, wherein the fluororesin layer is of a copolymer of VDF and CTFE and the rubber tube is of a rubber mixture containing acrylic rubber in an amount of 5 to 35 phr relative to a base material of the rubber tube containing at least one of an organic ammonium salt, an organic phosphonium salt and a polyamine additive. The hose ensures good adhesion between the rubber tube and fluororesin layer owing to the organic ammonium or phosphonium salt, or polyamide additive which the base rubber contains, while combining the advantages of the fluororesin layer according to the first aspect of this invention and the acrylic rubber according to the fourth aspect thereof.

According to a ninth aspect of this invention, there is provided a fuel hose comprising a single-layered or multi-layered rubber tube and a fluororesin layer formed wholly or partially on the inner surface of the single-layered rubber tube or the inner surface of the innermost layer of the multilayered rubber tube, wherein the fluororesin layer is of a copolymer of VDF and CTFE containing not more than 0.3% by weight of a metal salt relative to the copolymer and the rubber tube is of a rubber mixture containing 5 to 35 phr of acrylic rubber relative to a base material of the rubber tube containing at least one of an organic ammonium salt, an organic phosphonium salt and a polyamine additive. The hose combines the advantages of the fluororesin layer and the metal salt added to it according to the first aspect of this invention, the advantages of the acrylic rubber according to the fourth aspect thereof and the advantages of the organic ammonium salt, etc. in the base rubber according to the eighth aspect thereof.

According to a tenth aspect of this invention, the fluororesin layer is formed by powder coating, or causing a fluororesin powder to adhere to the inner surface of the innermost layer of the rubber tube. The layer has a desired thickness and is free from any defects such as pores.

According to an eleventh aspect of this invention, the VDF (A) and CTFE (B) in the fluororesin have a molar ratio A/B of 98/2 to 85/15. This range makes it easy to obtain a fluororesin powder having a low melting point and a flexible fluororesin layer having a low gasoline permeability.

According to a twelfth aspect of this invention, the organic ammonium salt is a DBU salt. It is particularly effective for ensuring adhesion between the rubber tube and the fluororesin layer.

The above and other advantages of this invention will become more apparent from the following description and the accompanying drawings.

Figure 1:
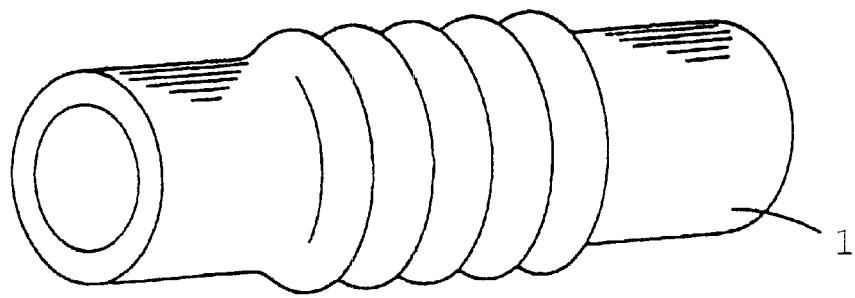
FIG. 1 is a perspective view of an example of a rubber tube for a fuel hose of this invention.

DETAILED DESCRIPTION OF THE INVENTION (Fuel Hose)

Description will now be made in detail of the fuel hose according to this invention. The fuel hose comprises a single-layered or multilayered rubber tube and a fluororesin layer formed on the inner surface of the innermost rubber layer. The fuel hose includes without limitation any hose used for a fuel piping in a motor vehicle or the like. The fuel hose is preferably used for a fuel piping required to have an excellent resistance to gasoline, particularly alcohol-containing gasoline, sour gasoline or amine detergent, or a fuel piping for alcohol or hydrogen, though it can be used for any other purposes.

(Rubber Tube)

Description will now be made of the rubber tube in detail. The rubber tube may be of the single-layered or multilayered structure. The rubber material of the rubber tube may be any rubber material used in the field of fuel hoses. Examples are epichlorohydrin rubber, NBR, fluororubber, NBR-PVC, chlorosulfonated polyethylene rubber, chlorinated polyethylene rubber, acrylic rubber and ethylene-propylene rubber.

Epichlorohydrin rubber, NBR, fluororubber or NBR-PVC is particularly preferable for ensuring high adhesion between the rubber tube and the fluororesin layer. One of these rubbers is preferably used for the inner layer of the rubber tube of a single-layered structure, or at least the innermost layer of the rubber tube of a multilayered structure.

Any type of epichlorohydrin rubber can be used, and may be selected from those which are used in the field of fuel hoses. Preferred examples are, however, an epichlorohydrin polymer (CO), a copolymer of epichlorohydrin and ethylene oxide (ECO) and a copolymer of any such polymer or copolymer with allyl glycidyl ether (GECO).

Any type of NBR can be used, though it is preferable to use one having a combined acrylonitrile content of 15 to 45%, more preferably 25 to 40%.

Any type of fluororubber can be used. Preferred examples are, however, a copolymer of vinylidene fluoride and hexafluoropropylene, a terpolymer of vinylidene fluoride, tetrafluoroethylene and hexafluoropropylene, a copolymer of tetrafluoroethylene and propylene and a blend of polyvinylidene fluoride and acrylic rubber.

Any type of NBR-PVC can be used, though it is preferable to use one having a combined acrylonitrile content of 25 to 45%, more preferably 30 to 40%, and a blended PVC content of 15 to 40%, more preferably 20 to 35%.

(Additives to Rubber Tube)

Description will now be made in detail of the additives to the rubber tube. The single-layered rubber tube or at least the innermost layer of the multilayered rubber tube preferably contains at least one of an organic ammonium salt, an organic phosphonium salt and a polyamine additive. When it contains at least two of them, it is preferable to contain a combination of at least one of an organic ammonium salt and an organic phosphonium salt with a polyamine additive. The polyamine additive is desirable in nature, since it also acts as a curing agent when added to hydrin rubber or fluororubber.

The content of these additives in the rubber tube is not specifically limited. It is, however, preferable to employ 0.5 to 10 parts, or more preferably 0.5 to 7 parts, by weight of an organic ammonium or phosphonium salt relative to 100 parts by weight of rubber. If its content is less than 0.5 part by weight, the effect of addition may be insufficient, and if its content exceeds 10 parts by weight, it may bring about a lower mechanical strength, or a higher compression set.

As regards the content of the polyamine additive, it is preferably 0.1 to 10 parts, and more preferably 0.5 to 6 parts, by weight relative to 100 parts by weight of rubber. If the content is less than 0.1 part by weight, the effect of addition may be insufficent, and if its content exceeds 10 parts by weight, a crack occurring to the tube in contact with gasoline may grow.

It is preferable to add 5 to 35 phr, and more preferably 5 to 25 phr of acrylic rubber to the base rubber for the rubber tube to improve its adhesion to the fluororesin layer. The addition of acrylic rubber makes it possible to obtain a good adhesion between the rubber tube and the fluororesin layer not only initially, but also after the filling of the hose with fuel even if no organic ammonium or phosphonium salt, or polyamine additive may be added.

The acrylic rubber is preferably composed of an alkyl or alkoxy acrylate having a cure site. Preferred examples of alkyl acrylates are methyl, ethyl and butyl acrylates. Preferred examples of alkoxy acrylates are methoxyethyl and ethoxyethyl acrylates.

Examples of the cure site include a chlorine group in 2-chloroethyl vinyl ether. Another example is an active chlorine group in vinyl chloroacetate or cyclol chloroacetate. Another example is an epoxy group in allyl glycidyl ether or glycidyl methacrylate. Another example is an unsaturated group in ethylidene-norbornene. Another example is a carboxyl group in acrylic acid. It is also possible to use a copolymer of alkyl or alkoxy acrylate and acrylonitrile, ethylene or vinyl acetate.

Although any ordinary mixer for preparing a rubber composition can be used for mixing any such additive into the rubber forming a specific rubber tube, it is preferable to use, for example, a banbury mixer, or a kneader.

Although any organic ammonium salt can be used, it is preferable to use a DBU salt such as that of a carboxylic acid or that of phenolic resin, in order to improve the adhesion of the fluororesin to the rubber. A preferred DBU salt of a carboxylic acid is that of a naphthoic acid as shown below.

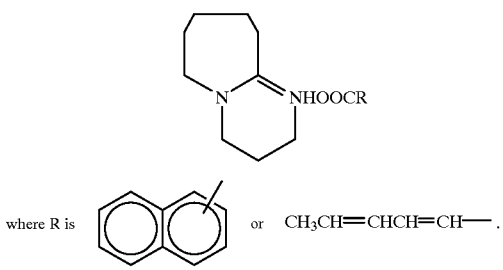

(1)

where R is ... or CH₃CH=CHCH=CH—.

A DBU salt of sorbic acid is also preferred. It is particularly preferable to use a combination of these DBU salts of carboxylic acids.

As other organic ammonium salts may be used tetrabutylammonium hydrogensulfate, tetramethylammonium hydrogensulfate, tetraethylammonium hydrogensulfate, trioctylmethylammonium hydrogensulfate, tridodecylmethylammonium hydrogensulfate and trimethylbenzylammonium hydrogensulfate, alone or in combinations thereof. It is also preferable to use these salts in combination with the DBU salts.

Any organic phosphonium salt can be used, and examples thereof are tetrabutylphosphonium chloride, tetrabutylphosphonium bromide, tributyl(methoxypropyl)phosphonium chloride, benzyltriphenylphosphonium chloride, benzyltrioctylphosphonium chloride, tetrabutylphosphonium benzotriazole, trioctylethylphosphonium benzotriazole and tetraphenylphosphonium bromide, which may be used alone or in combinations thereof.

It is also possible to use, alone or in combinations, a phosphonium benzo-triazolate, or tolyltriazolate having one of tetrabutyl, tetraoctyl, methyltrioctyl, butyltrioctyl, phenyltributyl, benzyltributyl, benzyltricyclohexyl, benzyltrioctyl, butyltriphenyl, octyltriphenyl, benzyltriphenyl, diphenyldi(diethylamino), phenylbenzyldi(dimethylamino), trifluoromethylbenzyl and tetrafluoropropyltrioctyl groups.

Any polyamine additive can be used, and examples thereof are 1, 6-hexamethylenediamine, triethylenetetramine, tetraethylenepentamine, triethylenediamine, paraphenylene-diamine, hexamethylenediamine carbamate, ethylenediamine carbamate, N, N'-dicinnamylidene-1, 6-hexanediamine, 4, 4'-bis(aminocyclohexyl)methane carbamate, 4, 4'-diaminodiphenyl ether and 4, 4'-diaminodiphenylmethane, which may be used alone or in combinations thereof.

(Fluororesin Layer)

Description will now be made of the fluororesin layer in detail. The fluororesin layer is formed from a copolymer of vinylidene fluoride (A) and chlorotrifluoro-ethylene (B). The fluororesin layer is formed on the inner surface of the single-layered rubber layer or of the innermost layer of the multilayered rubber layer. The fluororesin layer may be formed either on the whole inner surface of the rubber tube, or anywhere except specific portions of the inner surface of the rubber tube (e.g. that portion of the hose at which it will be connected to another device).

The A and B are used in a molar ratio not specifically limited, but preferably in the range of 98/2 to 85/15 (A/B).

If the content of vinylidene fluoride is higher, the fluororesin has a relatively high melting temperature and a relatively high rigidity. As a result, the fuel hose has a high regidity, which will cause the difficulty in adhesion between the fluororesin layer and the rubber tube. If it is lower, the fluororesin may have too low a melting temperature to withstand the temperature at which the fuel hose will be used. It also has a relatively high permeability to gasoline.

The fluororesin copolymer preferably contains a metal salt in an amount not exceeding 0.3% by weight relative to the copolymer. A more preferable content of the metal salt is 0.05 to 0.3% by weight. The metal salt is preferably a salt of a monovalent or divalent metal, or a neutral metal salt. It is more preferably a halide, hydroxide, carbonate, sulfate or other inorganic acid salt of a monovalent or divalent metal. Potassium chloride is, among others, preferred.

Any suitable method can be employed for incorporating a metal salt. For example, it will be possible to add a metal salt powder to a molten fluororesin, or it will also be possible to dip a fluororesin powder for powder coating in a metal salt solution for causing the metal salt to adhere to the resin particles, and dry those particles.

Although the fluororesin layer is not specifically limited in thickness, its thickness is preferably not larger than 0.5 mm, and more preferably from 0.05 to 0.2 mm, to ensure that the fuel hose be satisfactorily flexible and impermeable to gasoline. Its thickness may further be reduced to a range of 0.03 to 0.15 mm if the fluororesin copolymer contains a metal salt as mentioned above.

Any of various kinds of additives, such as an oxidation inhibitor, a crystallization accelerator, a plasticizer, a coloring agent and a flame retardant, can be added to the fluororesin forming the fluororesin layer if it does not adversely affect the advantages or results of this invention.

(Process for Manufacturing a Fuel Hose)

Description will now be made in detail of a process for manufacturing a fuel hose. Any process for manufacturing a fuel hose can be employed if it is a practically possible one. The following is an example. This example is a process for manufacturing a fuel hose comprising a single-layered rubber tube, corrugated substantially in its middle portion as shown in FIG. 1, and having a fluororesin layer formed on the inner surface of the rubber tube.

A predetermined amount of acrylic rubber is first blended with an uncured rubber of any of epichlorohydrin rubber, NBR, fluororubber and NBR-PVC, and the blend is injected through an injection molding machine. Then, it is cured and formed into a corrugated shape by a known method to form a rubber tube 1 having a single-layered wall as shown in FIG. 1.

Then, a fluororesin powder containing a metal salt is caused to adhere by powder coating to the inner surface of the rubber tube 1 excluding its portions adjacent to both of its open ends, and is melted. More specifically, air and the fluororesin powder are fed through an air pipe and a resin powder feeding pipe to a spray gun connected to a high voltage generator. Then, a negatively or positively charged fluororesin powder is jetted out of the spout of a long nozzle attached to the spray gun. The fluororesin powder containing the metal salt is thereby caused to adhere to the inner surface of the rubber tube 1, and melted by heating to form a film.

The heating there is effected, for example, by using a heating oven in which the rubber tube 1 having its inner surface coated with the fluororesin powder is heated as a whole. According to another heating method, a rod-shaped heater is inserted into the rubber tube 1 having its inner surface coated with the fluororesin powder for heating it from inside. The heating conditions are appropriately determined depending on the kinds of the fluororesin powder used and the rubber forming the rubber tube 1. It is usually heated at 150° C. to 250° C. for 2 to 40 minutes, preferably at 170° C. to 240° C. for 3 to 35 minutes.

Figure 2A:
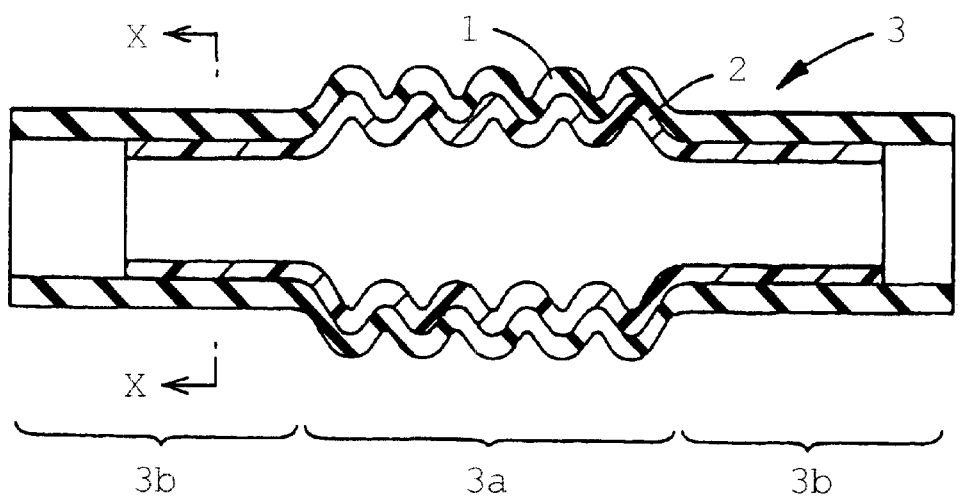
FIG. 2A is a longitudinal sectional view of the fuel hose embodying this invention.
Figure 2B:
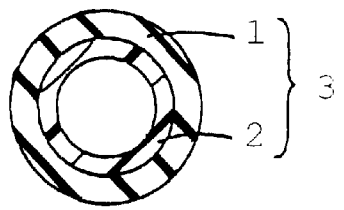
FIG. 2B is a sectional view taken along the line X—X of FIG. 2A.
Figure 3:
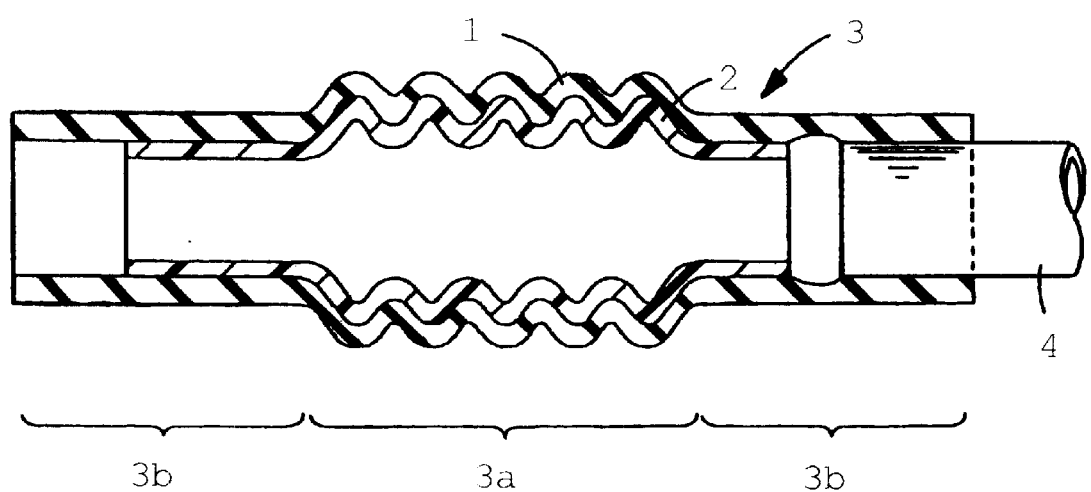
FIG. 3 is a longitudinal sectional view of the fuel hose embodying this invention and in a state of use.

The rubber tube 1 on which a film has been formed from the fluororesin powder melted by heating as described is removed from the oven, and cooled, whereby a fuel hose 3 as shown in FIGS. 2A and 2B can be obtained. The fuel hose 3 has a fluororesin layer 2 formed on a specific portion of the inner surface of the rubber tube (or rubber layer) 1. The fuel hose 3 has a corrugated wall portion 3a located substantially in its middle portion and a straight wall end portion 3b located toward each end thereof. When the fuel hose 3 is used, a metal pipe 4 to be connected to it is, for example, inserted into one of its end portions 3b, as shown in FIG. 3. Although FIGS. 2A and 3 show the rubber tube 1 not having any fluororesin layer 2 formed on either of its end portions, the fluororesin layer 2 may alternatively be formed on the whole inner surface of the rubber tube 1 including its end portions.

The fluororesin layer 2 in the fuel hose 3 has a thickness usually ranging from 0.05 to 0.2 mm. The rubber layer 1 has a thickness ranging usually from 2 to 6 mm and preferably from 2 to 4 mm.

The rubber tube 1 can be formed not only by injection molding, but also by another method, such as extrusion molding, depending on its desired shape.

The rubber tube 1 may alternatively be a straight or bent tube not having any corrugated portion as shown in FIG. 1.

Moreover, the rubber tube is not limited to one having a single-layered wall as shown in FIG. 1. It may alternatively be a tube having a multilayered wall formed by two or more rubber layers including the innermost layer formed from epichlorohydrin rubber, NBR, fluororubber or NBR-PVC. A rubber tube having a multilayered wall can be formed, for example, by injection molding an inner layer and then injection molding an outer layer around it, or by extrusion molding inner and outer layers together. It is also possible to form an outer layer by an appropriate method and then coat its whole inner surface with an inner layer.

EXAMPLES

Reference is made to Tables 1 to 11 which will be found after the following description.

Tables 1 to 4 show Examples of the invention and Comparative Examples including rubber tubes each having a single-layered wall and Tables 5 to 7 show Examples and Comparative Examples including rubber tubes each having a multilayered wall (an inner and an outer layer). The rubber compositions used to form the rubber tubes are shown by a variety of symbols, such as A1, A12, S1, B1, C3 and V1, in Tables 1 to 7, and specifically in parts by weight in Tables 8 to 11.

The rubber tubes as shown in Tables 1 to 7 were each prepared by curing the corresponding rubber composition at 180° C. for five minutes in an injection molding machine. Each tube was a corrugated one having an inside diameter of 35 mm, a wall thickness of 4 mm and a length of 200 mm. The inorganic metal salt appearing in Tables 1 to 7 was potassium chloride.

Each rubber tube was electrostatically coated on its inner surface with a layer of a fluororesin powder having a thickness of 0.2 mm. It was of a fluororesin copolymer containing VDF and CTFE in a molar ratio of 95:5. Its electrostatic coating was carried out by causing a corona discharge (minus charge) to occur at 60 kV/10 μA. Then, the tube was heated at 220° C. for 25 minutes in an oven, so that the fluororesin powder might be melted. Then, it was removed from the oven, and cooled, whereby there was obtained a hose having a fluororesin layer formed on the inner surface of the rubber tube.

[Evaluation of Hoses]

Each hose including a rubber tube having a single-layered or multilayered wall was evaluated for fuel impermeability. It was also evaluated for adhesion between the rubber tube (or its inner most layer in case of a multilayered rubber tube) and the fluororesin layer. The results are shown in the corresponding table.

[Fuel Impermeability]

Evaluation was made by employing three kinds of testing gasoline, Fuel C, M15 and E10. Fuel C is a liquid obtained by mixing toluene and isooctane in a volume ratio of 50:50 in accordance with JIS K6258. M15 is a liquid obtained by mixing methanol and Fuel C in a volume ratio of 15:85. E10 is a liquid obtained by mixing ethanol and Fuel C in a volume ratio of 10:90. Each hose was filled with one of the three kinds of testing gasoline, and left to stand at a temperature of 60° C. for 168 hours. Then, the hose was emptied, filled with a fresh supply of the same gasoline, and left to stand at a temperature of 60° C. for 72 hours. Then, its weight was compared between before and after 72 hours, and their difference was used for calculating the loss of fuel by permeation per day. The results are shown in the corresponding table.

[Adhesion]

An adhesion test was conducted in accordance with JIS K6256. A ring having a width of 25 mm was cut from one end of each hose and a test specimen was prepared by cutting a slit axially in the ring. The rubber and fluororesin layers were separated from each other over a certain distance from the slit of the specimen, and were fastened at their ends to grips in a tensile testing machine. The test was conducted by employing a pull rate of 25 mm/min., and the load as measured was used for calculating an initial value of peeling strength between the two layers. A test specimen was prepared from another hose belonging to the same Example or Comparative Example in the same way, but after it had been filled with Fuel C, and left to stand at 40° C. for 72 hours. It was tested in the same way and a value indicating peeling strength after fuel filling was calculated. The two values of peeling strength were compared for examining the adhesion between the rubber tube (or its innermost layer) and the fluororesin layer. The results are shown in the corresponding table.

TABLE 1

|  |  | Example | | | Comp. Ex. |
|---|---|---|---|---|---|
|  |  | 1 | 2 | 3 | 1 |
| Rubber composition for single-layered tube |  | A1 | A1 | A1 | A1 |
| Inorganic metal salt (wt. %) |  | 0.1 | 0.2 | 0.3 | 0 |
| Fuel impermeability (g/hose/day) | Fuel C | 0.36 | 0.30 | 0.25 | 0.40 |
|  | M15 | 5.2 | 4.5 | 3.7 | 5.8 |
|  | E10 | 1.7 | 1.5 | 1.2 | 2.0 |
| Peeling strength (N/mm) | Initial | 4.2 | 4.4 | 4.6 | 4.1 |
|  | After fuel filling | 2.2 | 2.3 | 2.5 | 2.2 |

TABLE 2

|  | Example | | | | | Comp. Ex. |
|---|---|---|---|---|---|---|
|  | 4 | 5 | 6 | 7 | 8 | 2 |
| Rubber composition for single-layered tube | A2 | A3 | A4 | A5 | A6 | S1 |
| Inorganic metal salt (wt. %) | 0 | 0 | 0 | 0 | 0 | 0 |

TABLE 2-continued

|  | Example | | | | | Comp. Ex. |
|---|---|---|---|---|---|---|
|  | 4 | 5 | 6 | 7 | 8 | 2 |
| Fuel impermeability (g/hose/day) | | | | | | |
| Fuel C | 0.40 | 0.41 | 0.40 | 0.43 | 0.42 | 0.41 |
| M15 | 5.6 | 5.8 | 5.7 | 5.8 | 5.7 | 5.7 |
| E10 | 2.2 | 2.1 | 2.0 | 2.2 | 2.1 | 2.1 |
| Peeling strength (N/mm) | | | | | | |
| Initial | 4.5 | 4.6 | 4.5 | 4.4 | 4.4 | 0.5 |
| After fuel filling | 3.0 | 3.0 | 3.1 | 3.2 | 3.1 | 0.2 |

TABLE 3

|  | Example | | | | | |
|---|---|---|---|---|---|---|
|  | 9 | 10 | 11 | 12 | 13 | 14 |
| Rubber composition for single-layered tube | A7 | A8 | A9 | A10 | A11 | A12 |
| Inorganic metal salt (wt. %) | 0.2 | 0.2 | 0.2 | 0.2 | 0.2 | 0.2 |
| Fuel impermeability (g/hose/day) | | | | | | |
| Fuel C | 0.33 | 0.32 | 0.30 | 0.31 | 0.31 | 0.32 |
| M15 | 4.7 | 4.7 | 4.5 | 4.6 | 4.5 | 4.6 |
| E10 | 1.6 | 1.6 | 1.5 | 1.5 | 1.5 | 1.6 |
| Peeling strength (N/mm) | | | | | | |
| Initial | 4.8 | 5.0 | 5.2 | 4.9 | 4.8 | 4.9 |
| After fuel filling | 3.6 | 3.6 | 3.8 | 3.6 | 3.6 | 3.7 |

TABLE 4

|  |  | Example | | Comp. Ex. | |
|---|---|---|---|---|---|
|  |  | 15 | 16 | 3 | 4 |
| Rubber composition for single-layered tube | | A13 | A14 | S1 | V1 |
| Inorganic metal salt (wt. %) | | 0.2 | 0.2 | 0 | 0 |
| Fuel impermeability (g/hose/day) | Fuel C | 0.32 | 0.30 | 0.41 | 0.43 |
|  | M15 | 4.7 | 4.6 | 5.8 | 6.0 |
|  | E10 | 1.7 | 1.5 | 2.0 | 2.1 |
| Peeling strength (N/mm) | Initial | 4.8 | 4.9 | 0.8 | 0.5 |
|  | After fuel filling | 3.6 | 3.7 | 0.4 | 0.2 |

TABLE 5

|  | Example | | | | | | |
|---|---|---|---|---|---|---|---|
|  | 17 | 18 | 19 | 20 | 21 | 22 | 23 |
| Rubber composition | | | | | | | |
| Inner layer | A2 | B1 | B2 | B3 | B4 | B5 | B6 |
| Outer layer | V1 | V1 | V1 | V1 | V1 | V1 | V1 |
| Inorganic metal salt (wt. %) | 0.2 | 0.2 | 0.2 | 0.2 | 0.2 | 0.2 | 0.2 |

TABLE 5-continued

|  | Example | | | | | | |
|---|---|---|---|---|---|---|---|
|  | 17 | 18 | 19 | 20 | 21 | 22 | 23 |
| Fuel impermeability (g/hose/day) | | | | | | | |
| Fuel C | 0.32 | 0.33 | 0.34 | 0.34 | 0.33 | 0.32 | 0.31 |
| M15 | 4.7 | 4.7 | 4.8 | 4.7 | 4.6 | 4.5 | 4.5 |
| E10 | 1.6 | 1.6 | 1.7 | 1.7 | 1.7 | 1.5 | 1.5 |
| Peeling strength (N/mm) | | | | | | | |
| Initial | 4.8 | 4.6 | 4.9 | 5.2 | 4.6 | 4.8 | 4.8 |
| After fuel filling | 3.4 | 3.4 | 3.5 | 3.7 | 3.3 | 3.4 | 3.5 |

TABLE 6

|  | Example | | | | | |
|---|---|---|---|---|---|---|
|  | 24 | 25 | 26 | 27 | 28 | 29 |
| Rubber composition | | | | | | |
| Inner layer | C1 | C2 | C3 | C4 | C5 | C6 |
| Outer layer | T1 | T1 | T1 | T1 | T1 | T1 |
| Inorganic metal salt (wt. %) | 0.2 | 0.2 | 02 | 0.2 | 0.2 | 0.2 |
| Fuel impermeability (g/hose/day) | | | | | | |
| Fuel C | 0.30 | 0.31 | 0.30 | 0.30 | 0.29 | 0.30 |
| M15 | 4.6 | 4.5 | 4.4 | 4.4 | 4.2 | 4.2 |
| E10 | 1.5 | 1.5 | 1.4 | 1.4 | 1.4 | 1.4 |
| Peeling strength (N/mm) | | | | | | |
| Initial | 4.7 | 4.5 | 5.0 | 4.5 | 4.5 | 4.7 |
| After fuel filling | 3.4 | 3.3 | 3.6 | 3.3 | 3.4 | 3.5 |

TABLE 7

|  | Example | | | | | Comp. Ex | |
|---|---|---|---|---|---|---|---|
|  | 30 | 31 | 32 | 33 | 34 | 5 | 6 |
| Rubber composition | | | | | | | |
| Inner layer | D1 | D2 | D3 | D4 | D5 | T1 | U1 |
| Outer layer | V1 | V1 | V1 | V1 | V1 | V1 | T1 |
| Inorganic metal salt (wt. %) | 0.2 | 0.2 | 0.2 | 0.2 | 0.2 | 0 | 0 |
| Fuel impermeability (g/hose/day) | | | | | | | |
| Fuel C | 0.33 | 0.34 | 0.33 | 0.32 | 0.34 | 0.41 | 0.39 |
| M15 | 4.5 | 4.8 | 4.5 | 4.4 | 4.6 | 5.8 | 5.5 |
| E10 | 1.5 | 1.6 | 1.5 | 1.5 | 1.6 | 2.1 | 2.0 |
| Peeling strength (N/mm) | | | | | | | |
| Initial | 4.5 | 4.9 | 4.4 | 4.5 | 4.6 | 0.5 | 0.7 |
| After fuel filling | 3.3 | 3.6 | 3.3 | 3.4 | 3.4 | 0.2 | 0.3 |

TABLE 8

| | A1 | A2 | A3 | A4 | A5 | A6 | A7 | A8 | A9 | A10 | A11 | A12 | A13 | A14 | S1 |
|---|---|---|---|---|---|---|---|---|---|---|---|---|---|---|---|
| Epichlorohydrin rubber | 100 | 100 | 100 | 100 | 100 | 100 | 100 | 100 | 100 | 100 | 100 | 100 | 100 | 100 | 100 |
| Acrylic rubber | | 10 | 10 | 10 | 10 | 10 | 5 | 10 | 25 | 10 | 10 | 10 | 10 | 10 | |
| Stearic acid | 2 | 2 | 2 | 2 | 2 | 2 | 2 | 2 | 2 | 2 | 2 | 2 | 2 | 2 | 2 |
| Magnesium oxide | 5 | 5 | 5 | 5 | 5 | 5 | | | | | 5 | 5 | 5 | 5 | |
| Carbon black | 40 | 40 | 40 | 40 | 40 | 40 | 40 | 40 | 40 | 40 | 40 | 40 | 40 | 40 | 40 |
| Basic silica | 10 | 10 | 10 | 10 | 10 | 10 | 10 | 10 | 10 | 10 | 10 | 10 | 10 | 10 | 10 |
| Calcium carbonate | 10 | 10 | 10 | 10 | 10 | 10 | 10 | 10 | 10 | 10 | 10 | 10 | 10 | 10 | 10 |
| Phthalic plasticizer | 5 | 5 | 5 | 5 | 5 | 5 | 5 | 5 | 5 | 5 | 5 | 5 | 5 | 5 | 5 |
| Carbamate aging inhibitor | 1 | 1 | 1 | 1 | 1 | 1 | 1 | 1 | 1 | 1 | 1 | 1 | 1 | 1 | 1 |
| DBU salt of naphthoic acid | 0.5 | 0.5 | 0.5 | | 0.5 | 0.5 | 2 | 2 | 2 | | | 2 | | 2 | |
| 4,4'-diaminodiphenyl ether | | | | 2 | | 1 | | | | | | | | | |
| N,N'-dicinnamylidene-1,6-hexanediamine | 2 | 2 | | | 2 | 2 | 2 | | | | | | | | |
| 4,4-diaminodiphenylmethane | | | | | | 1 | | | | | | | | | |
| Hydrotalcite *1 | | | | | | | 9 | 9 | 9 | 9 | | | | | 9 |
| 6-methylquinoxaline-2,3-dithiocarbonate | | | | | | | 1.5 | 1.5 | 1.5 | 1.5 | | | | | 1.5 |
| Ethylenethiourea | | | | | | | | | | | 1 | 1 | | | |
| CBS | | | | | | | | | | | 1 | 1 | | | |
| Polyol *2 | | | | | | | | | | | | | 1.5 | 1.5 | |

*1 DHT-4A, product of Kyowa Chemical Industrial Co., Ltd.
*2 Viton Curative No. 30, product of Du Pont

TABLE 9

| | B1 | B2 | B3 | B4 | B5 | B6 | T1 |
|---|---|---|---|---|---|---|---|
| NBR *3 | 100 | 100 | 100 | 100 | 100 | 100 | 100 |
| Acrylic rubber | 5 | 10 | 25 | 10 | 10 | 10 | |
| Zinc oxide | 5 | 5 | 5 | 5 | 5 | 5 | 5 |
| Stearic acid | 1 | 1 | 1 | 1 | 1 | 1 | 1 |
| Basic silica | 20 | 20 | 20 | 20 | 20 | 20 | 20 |
| Carbon black FEF | 35 | 35 | 35 | 35 | 35 | 35 | 35 |
| Carbon black SRF | 30 | 30 | 30 | 30 | 30 | 30 | 30 |
| Ether ester plasticizer | 25 | 25 | 25 | 25 | 25 | 25 | 25 |
| DBU salt of naphthoic acid | 2 | 2 | 2 | | | 2 | |
| N,N'-dicinnamylidene-1,6-hexanediamine | | | | | 4 | 3 | |
| Sulfur | 0.5 | 0.5 | 0.5 | 0.5 | 0.5 | 0.5 | 0.5 |
| TETD | 2.1 | 2.1 | 2.1 | 2.1 | 2.1 | 2.1 | 2.1 |
| CBS | 1.2 | 1.2 | 1.2 | 1.2 | 1.2 | 1.2 | 1.2 |
| Peroxide (Percumyl D40 *4) | 4.5 | 4.5 | 4.5 | 4.5 | 4.5 | 4.5 | 4.5 |

*3 Having a combined acrylonitrile content of 35%
*4 Product of NOF Corp.

TABLE 10

| | C1 | C2 | C3 | C4 | C5 | C6 | U1 |
|---|---|---|---|---|---|---|---|
| FKM *5 | 100 | 100 | 100 | 100 | | | 100 |
| FKM *6 | | | | | 100 | 100 | |
| Acrylic rubber | 10 | 10 | 25 | 10 | 10 | 10 | |
| Zinc oxide | | | | | | | 3 |
| Magnesium oxide | 3 | 3 | 3 | 3 | 3 | 3 | |
| Carbon black MT | 20 | 20 | 20 | 20 | 20 | 20 | 20 |
| DBU salt of naphthoic acid | 2 | | | | | 2 | |
| Calcium hydroxide | 6 | 6 | 6 | | 6 | 6 | 6 |
| N,N'-dicinnamylidene-1,6-hexanediamine | | | | 3 | | | |

*5 A copolymer of vinylidene fluoride and hexafluoropropylene (Daiel G755, product of Daikin Industries, Ltd.)
*6 A terpolymer of vinylidene fluoride, hexafluoropropylene and tetrafluoroethylene (Daiel G755, product of Daikin Industries, Ltd.)

TABLE 11

| | D1 | D2 | D3 | D4 | D5 | V1 |
|---|---|---|---|---|---|---|
| NBR-PVC *7 | 100 | 100 | 100 | 100 | 100 | 100 |
| Acrylic rubber | 10 | 25 | 10 | 10 | 10 | |
| Stearic acid | 0.7 | 0.7 | 0.7 | 0.7 | 0.7 | 0.7 |
| Zinc oxide | 3 | 3 | 3 | 3 | 3 | 3 |
| Carbon black SRF | 75 | 75 | 75 | 75 | 75 | 75 |
| Calcium carbonate | 20 | 20 | 20 | 20 | 20 | 20 |
| Ether ester plasticizer | 30 | 30 | 30 | 30 | 30 | 30 |
| N-phenyl-N'-isopropyl-p-phenylenediamine | 2 | 2 | 2 | 2 | 2 | 2 |
| DBU salt of naphthoic acid | 2 | 2 | | | 2 | |
| N,N'-dicinnamylidene-1,6-hexanediamine | | | | 4 | 3 | |
| Sulfur | 1.5 | 1.5 | 1.5 | 1.5 | 1.5 | 1.5 |
| MBTS | 1.5 | 1.5 | 1.5 | 1.5 | 1.5 | 1.5 |
| TMTM | 1.5 | 1.5 | 1.5 | 1.5 | 1.5 | 1.5 |

*7 Having an NBR/PVC ratio of 70/30 (by weight) and a combined acrylonitrile content of 35%

While the preferred embodiments have been described, variations thereof will occur to those skilled in the art within the scope of the present inventive concepts which are delineated by the following claims.

What is claimed is:

1. A fuel hose comprising a single-layered or multilayered rubber tube and a fluororesin wholly or partially on the inner surface of the single-layered rubber tube or on the inner surface of the innermost layer of the multilayered rubber tube, wherein the fluororesin layer comprises a copolymer of vinylidene fluoride (VDF) and chlorotrifluoroethylene (CTFE), and the rubber of the rubber tube is a rubber mixture comprising a base rubber and acrylic rubber, where the acrylic rubber is present in an amount of from 5 to 35 parts per hundred parts by weight of the base rubber (phr) of the rubber tube and wherein the fluororesin layer comprises solidified melted resin powder.

2. The fuel hose according to claim 1, wherein the fluororesin layer has a thickness not exceeding 0.5 mm.

3. The fuel hose according to claim 1, wherein the fluororesin layer has a thickness of 0.05 to 0.2 mm.

4. The fuel hose according to claim 1, wherein the fluororesin layer is on the inner surface of the rubber tube or on the innermost layer thereof, excluding its portions adjacent to both of its open ends.

5. The fuel hose according to claim 1, wherein the copolymer contains VDF and CTFE in a molar ratio of 98:2 to 85:15.

6. The fuel hose according to claim 1, wherein the rubber mixture comprises the acrylic rubber in an amount of from 5 to 25 phr, and/or comprises an alkyl or alkoxy acrylate having a cure site as the acrylic rubber.

7. The fuel hose according to claim 1, wherein the rubber tube contains at least one of an organic ammonium salt, an organic phosphonium salt and a polyamine additive.

8. The hose according to claim 1, wherein the single-layered rubber tube or at least the innermost layer of the rubber tube is a member selected from the group consisting of epichlorohydrin rubber, nitrile-butadiene rubber (NBR), fluororubber and NBR-polyvinylchloride (NBR-PVC).

9. The hose according to claim 8, wherein the epichlorohydrin rubber is an epichlorohydrin polymer, a copolymer of epichlorohydrin and ethylene oxide, or a copolymer or terpolymer thereof with allyl glycidyl ether.

10. The hose according to claim 8, wherein the NBR has a combined acrylonitrile content of from 15 to 45% by weight.

11. The hose according to claim 8, wherein the fluororubber is a copolymer of vinylidene fluoride and hexafluoropropylene, a terpolymer of vinylidene fluoride, tetrafluoroethylene and hexafluoropropylene, a copolymer of tetrafluoroethylene and propylene, or a mixture of polyvinylidene fluoride and acrylic rubber.

12. The hose according to claim 8, wherein the NBR-PVC has a combined acrylonitrile content of from 25 to 45% by weight.

13. A fuel hose comprising a single-layered or multilayered rubber tube and a fluororesin layer wholly or partially on the inner surface of the single-layered rubber tube or the inner surface of the innermost layer of the multilayered rubber tube, wherein the fluororesin layer comprises a copolymer of vinylidene fluoride (VDF) and chlorotrifluoroethylene (CTFE) containing from 0.05 to 0.3% by weight of a metal salt relative to weight of the copolymer, and the rubber of the rubber tube comprises a rubber mixture comprising a base rubber and acrylic rubber, where the acrylic rubber is present in an amount of from 5 to 35 parts per hundred parts by weight of the base rubber (phr) of the rubber tube and wherein the fluororesin layer comprises solidified melted resin powder.

14. The fuel hose according to claim 13, wherein the rubber tube contains at least one of an organic ammonium salt, an organic phosphonium salt and a polyamine additive.

15. The fuel hose according to claim 13, wherein the metal salt is a salt of a monovalent or divalent metal.

16. The fuel hose according to claim 15, wherein the metal salt is at least one inorganic salt selected from the group consisting of a halide, a hydroxide, a carbonate and a sulfate of the monovalent or divalent metal.

17. The fuel hose according to claim 16, wherein the metal salt is potassium chloride.

* * * * *